United States Patent
Yano

(10) Patent No.: US 8,508,177 B2
(45) Date of Patent: Aug. 13, 2013

(54) STEPPING MOTOR DRIVE DEVICE

(75) Inventor: Takehiro Yano, Osaka (JP)

(73) Assignee: Panasonic Corporation, Osaka (JP)

( * ) Notice: Subject to any disclaimer, the term of this patent is extended or adjusted under 35 U.S.C. 154(b) by 299 days.

(21) Appl. No.: 12/984,415

(22) Filed: Jan. 4, 2011

(65) Prior Publication Data
US 2011/0309783 A1 Dec. 22, 2011

(30) Foreign Application Priority Data
Jun. 17, 2010 (JP) ................................ 2010-138256

(51) Int. Cl.
*H02P 8/00* (2006.01)
*H02P 8/14* (2006.01)

(52) U.S. Cl.
CPC ........................................ *H02P 8/14* (2013.01)
USPC ........... 318/696; 318/685; 318/686; 318/687; 318/688

(58) Field of Classification Search
CPC ........................................................ H02P 8/14
USPC ........................................ 318/696, 685–688
See application file for complete search history.

(56) References Cited

U.S. PATENT DOCUMENTS

| 5,332,956 | A | * | 7/1994 | Oh ................................ 318/799 |
| 5,359,154 | A | * | 10/1994 | Tsukasa et al. ............... 177/145 |
| 6,333,646 | B1 | | 12/2001 | Tsuzuki |
| 6,563,766 | B1 | * | 5/2003 | Nakamiya ....................... 368/64 |

FOREIGN PATENT DOCUMENTS

| JP | 08-182391 | 7/1996 |
| JP | 3148600 | 3/2001 |
| JP | 2006-288056 | 10/2006 |

* cited by examiner

*Primary Examiner* — Bentsu Ro
*Assistant Examiner* — David Luo
(74) *Attorney, Agent, or Firm* — McDermott Will & Emery LLP

(57) ABSTRACT

A stepping motor drive device includes: a first pulse generation circuit that generates pulses at rising or falling edges of a first clock signal; a second pulse generation circuit that generates pulses at rising and falling edges of a second clock signal; a first mask circuit that outputs or masks the output of the first pulse generation circuit depending on whether the second clock signal is normal; a second mask circuit that outputs or masks the output of the second pulse generation circuit depending on whether the first clock signal is normal; a logic circuit that logically combines the outputs of the mask circuits; a step position control circuit that determines the step position of a motor according to the output of the logic circuit; and a motor drive section that supplies a current to the motor according to the output of the step position control circuit.

11 Claims, 15 Drawing Sheets

STEPPING MOTOR DRIVE DEVICE

CROSS-REFERENCE TO RELATED APPLICATION

This application claims priority to Japanese Patent Application No. 2010-138256 filed on Jun. 17, 2010, the disclosure of which including the specification, the drawings, and the claims is hereby incorporated by reference in its entirety.

BACKGROUND

The present disclosure relates to a motor drive device, and more particularly to a technology for driving a stepping motor.

In recent years, stepping motors have been used in various fields including information equipment fields. As drive schemes for a stepping motor, known are a clock scheme in which the motor is rotated by a predetermined step angle at edge timing of a clock signal and a parallel scheme in which the motor is rotated based on a combination of a signal indicating the polarity of an exciting current for the motor and a signal indicating the current amount of the exciting current. Recently, the clock scheme is often used because of its advantages that the control is easy and the number of signals is small.

A stepping motor drive device employing the clock scheme is shown in FIG. 19. A pulse generation circuit 60 generates pulses at the timing of rising edges of a clock signal. According to the output of the pulse generation circuit 60, a step position control circuit 61 generates a signal for controlling a motor 63 in an excitation mode corresponding to an excitation mode signal. A motor drive circuit 62 supplies currents to windings 64 and 65 of the motor 63 according to the output of the step position control circuit 61 (see Japanese Patent Publication No. 2006-288056, for example).

SUMMARY

As specifications for generation of pulses for driving a stepping motor, there are a "both-edge" specification using timing at both rising and falling edges of a clock signal and a "one-edge" specification using timing at either rising or falling edges of a clock signal. In general, stepping motor drive devices conforming to the both-edge specification are manufactured separately from those conforming to the one-edge specification. However, since devices conforming to these specifications have many components in common, it is desirable for one motor drive device to conform to both the both-edge specification and the one-edge specification from the standpoint of efficiency of product development.

However, in a stepping motor drive device conforming to both specifications, a component thereof related to a specification unwanted by the user may cause a malfunction of the motor drive device. For example, such a component may perform an unintended operation due to noise caused by disturbance, etc., resulting in a malfunction of the motor drive device.

According to a stepping motor drive device of the present disclosure, it is possible for one motor drive device to conform to both the both-edge specification and the one-edge specification, and moreover such a motor drive device conforming to both specifications can be prevented from malfunctioning.

An example stepping motor drive device includes: a first pulse generation circuit configured to generate pulses in synchronization with either rising edges or falling edges of a first clock signal; a second pulse generation circuit configured to generate pulses in synchronization with both rising edges and falling edges of a second clock signal; a logic circuit configured to logically combine outputs of the first and second pulse generation circuits; a step position control circuit configured to determine a step position of a stepping motor according to an output of the logic circuit, and a motor drive section configured to supply a current to the stepping motor according to an output of the step position control circuit.

Having the above configuration, one stepping motor drive device can conform to both the both-edge specification and the one-edge specification.

Another example stepping motor drive device includes: a first pulse generation circuit configured to generate pulses in synchronization with either rising edges or falling edges of a first clock signal; a second pulse generation circuit configured to generate pulses in synchronization with both rising edges and falling edges of a second clock signal; a first clock determination circuit configured to determine whether the first clock signal is normal; a second clock determination circuit configured to determine whether the second clock signal is normal; a first mask circuit configured to receive an output of the first pulse generation circuit, and output the output of the first pulse generation circuit as it is if the second clock signal is not normal or mask the output of the first pulse generation circuit if the second clock signal is normal; a second mask circuit configured to receive an output of the second pulse generation circuit, and output the output of the second pulse generation circuit as it is if the first clock signal is not normal or mask the output of the second pulse generation circuit if the first clock signal is normal; a logic circuit configured to logically combine outputs of the first and second mask circuits; a step position control circuit configured to determine a step position of a stepping motor according to an output of the logic circuit, and a motor drive section configured to supply a current to the stepping motor according to an output of the step position control circuit.

Having the above configuration, when either one of the clock signals is normal, the output of a pulse generation circuit into which the other clock signal is input is masked. That is, when the stepping motor drive device is being driven according to one of the edge specifications, it is prevented from malfunctioning due to an unintended output from a pulse generation circuit related to the other specification.

DETAILED DESCRIPTION

First Embodiment

Figure 1:
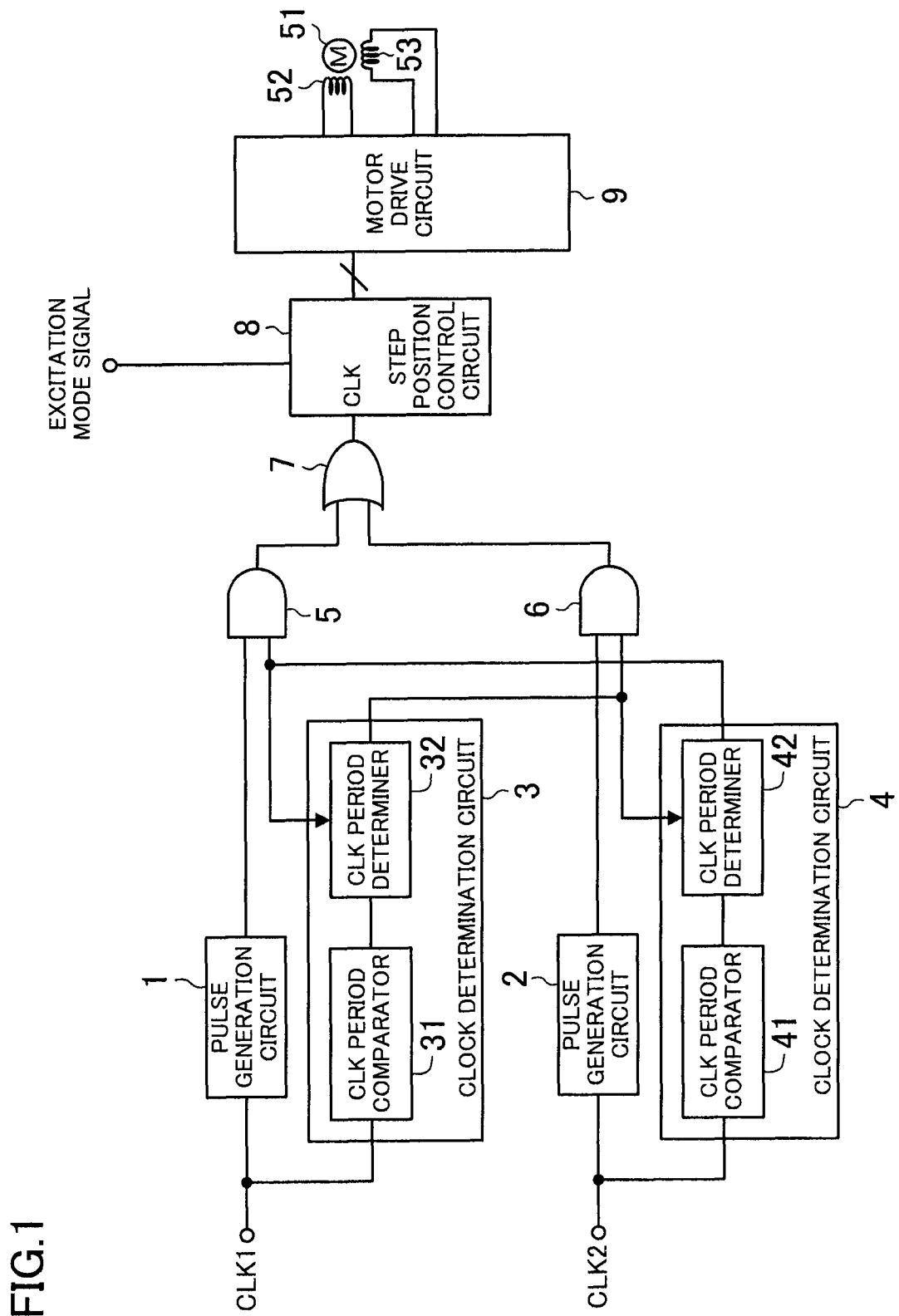
FIG. 1 is a block diagram of a stepping motor drive device of the first embodiment.

FIG. 1 is a block diagram of a stepping motor drive device of the first embodiment. A pulse generation circuit 1 generates high differential pulses in synchronization with rising edges of a clock signal CLK1. Alternatively, the pulse generation circuit 1 may generate high differential pulses in synchronization with falling edges of the clock signal CLK1. A pulse generation circuit 2 generates high differential pulses in synchronization with rising and falling edges of a clock signal CLK2.

Clock determination circuits 3 and 4 respectively determine whether the clock signals CKL1 and CLK2 are normal, and change the level of their outputs from high to low when the clocks are normal. The clock determination circuit 3 can be comprised of a CLK period comparator 31 that compares the period of CLK1 with that of a reference clock signal CLKC and a CLK period determiner 32 that determines whether CLK1 is normal based on the output of the CLK period comparator 31. The clock determination circuit 4 can be comprised of a CLK period comparator 41 that compares the period of CLK2 with that of the reference clock signal CLKC and a CLK period determiner 42 that determines whether CLK2 is normal based on the output of the CLK period comparator 41. Since the clock determination circuits 3 and 4 are the same in configuration, only the clock determination circuit 3 will be described hereinafter.

Figure 2:
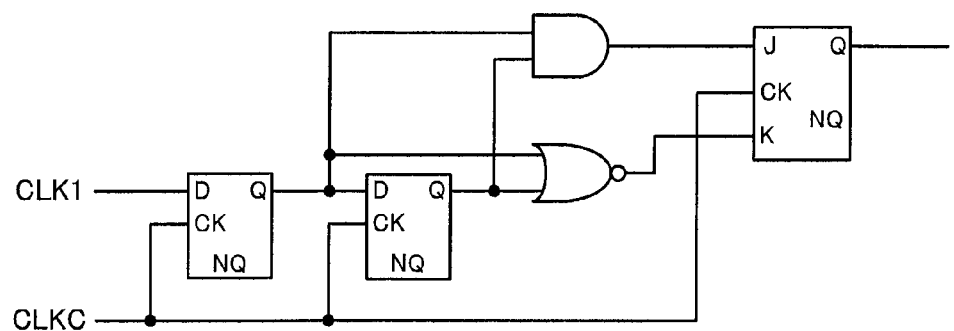
FIG. 2 is a block diagram of a CLK period comparator in FIG. 1.
Figure 3:
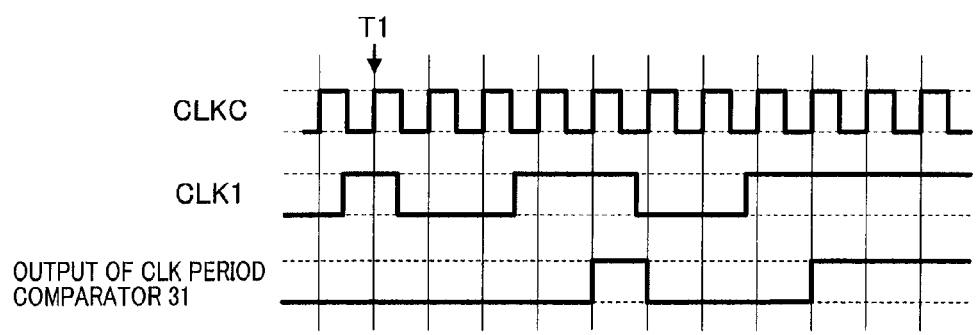
FIG. 3 is a timing chart of the CLK period comparator of FIG. 2.

The CLK period comparator 31 can be configured as shown in FIG. 2. The CLK period comparator 31 compares the period of CLK1 with that of CLKC, and outputs a pulse when the period of CLK1 is longer. For example, as shown in FIG. 3, the CLK period comparator 31 outputs a pulse if two or more pulses of CKLC are generated during the time period when CLK1 is high. At time T1, therefore, no pulse is generated from the CLK period comparator 31.

Figure 4:
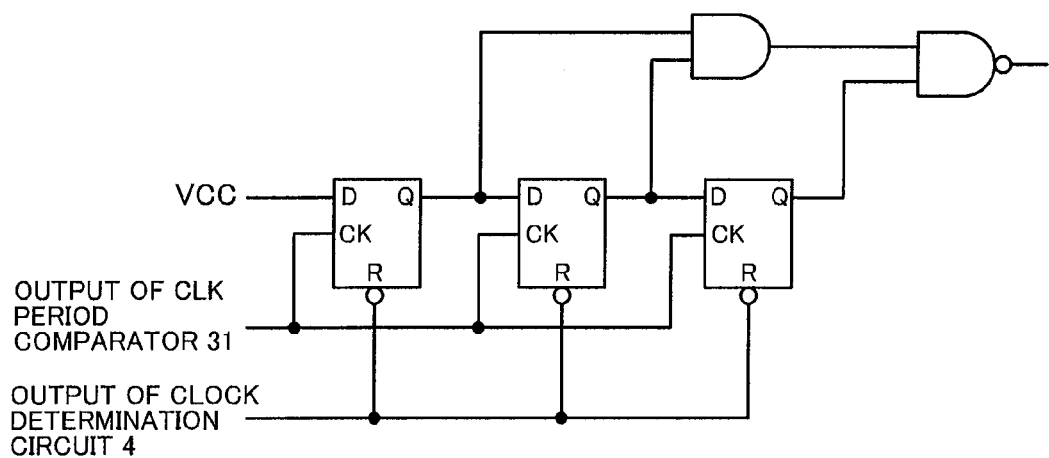
FIG. 4 is a block diagram of a CLK period determiner in FIG. 1.
Figure 5:
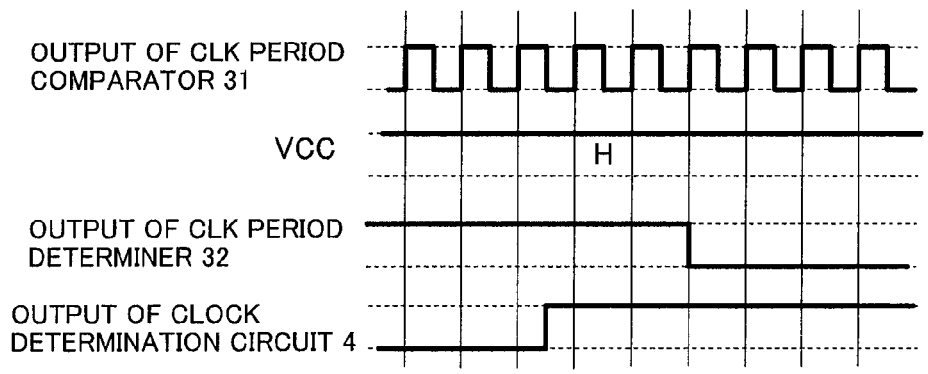
FIG. 5 is a timing chart of the CLK period determiner of FIG. 4.

The CLK period determiner 32 can be configured as shown in FIG. 4, in which VCC is a high-level power supply voltage. The CLK period determiner 32 counts pulses output from the CLK period comparator 31 when CLK2 is not normal, i.e., the output of the clock determination circuit 4 is high. The CLK period determiner 32 determines that CLK1 is normal once the count becomes '3', for example, and changes its output from high to low as shown in FIG. 5.

Referring back to FIG. 1, mask circuits 5 and 6 each can be comprised of an AND circuit. The mask circuit 5 receives the outputs of the pulse generation circuit 1 and the clock determination circuit 4, and outputs the output of the pulse generation circuit 1 as it is when CLK2 is not normal, i.e., the output of the clock determination circuit 4 is high. When CLK2 is normal, i.e., the output of the clock determination circuit 4 is low, the mask circuit 5 masks the output of the pulse generation circuit 1. The mask circuit 6 receives the outputs of the pulse generation circuit 2 and the clock determination circuit 3, and outputs the output of the pulse generation circuit 2 as it is when CLK1 is not normal, i.e., the output of the clock determination circuit 3 is high. When CLK1 is normal, i.e., the output of the clock determination circuit 3 is low, the mask circuit 6 masks the output of the pulse generation circuit 2. A logic circuit 7, which logically combines the outputs of the mask circuits 5 and 6, can be comprised of an OR circuit.

A step position control circuit 8 receives the output of the logic circuit 7 as a clock signal CLK and, according to CLK, generates a control signal for controlling the step position of a stepping motor 51 in an excitation mode corresponding to a supplied excitation mode signal. The excitation mode may be set in advance in the step position control circuit 8. A motor drive circuit 9 supplies currents to windings 52 and 53 of the stepping motor 51 according to the control signal.

Figure 6:
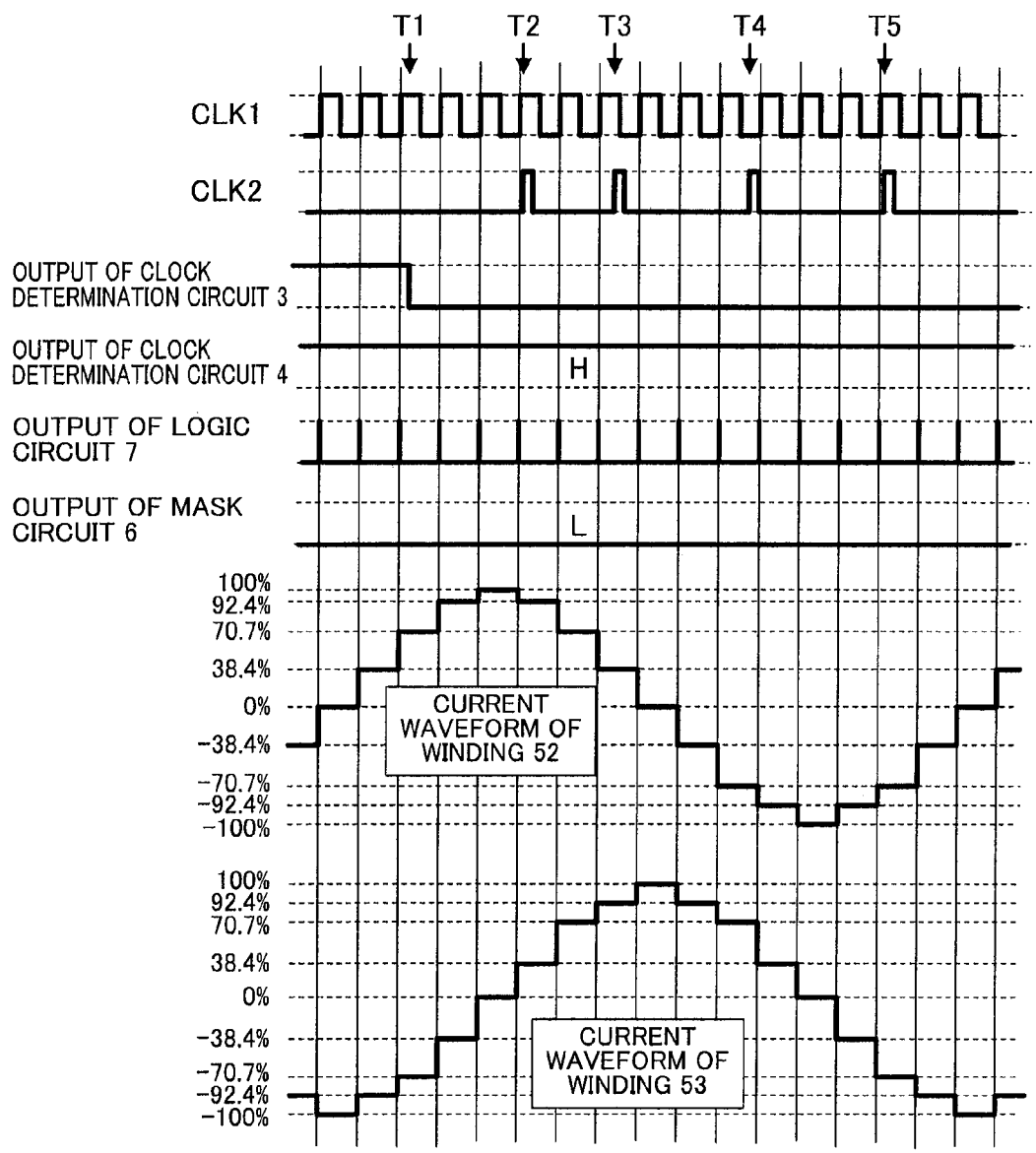
FIG. 6 is a timing chart of the motor drive device of FIG. 1 driven with W1-2 phase excitation.

The operation of the stepping motor drive device of this embodiment will be described with reference to FIG. 6, in which it is assumed that only CLK1 is input. Since CLK2 is not input, the output of the pulse generation circuit 2 is low. Also, since it is determined that neither CLK1 nor CLK2 is normal immediately after startup of the motor drive device, the outputs of the clock determination circuits 3 and 4 are both high. Therefore, the mask circuit 5 outputs the output of the pulse generation circuit 1 as it is, and the output of the mask circuit 6 is low.

Once determining that CLK1 is normal at time T1, the clock determination circuit 3 changes its output to low. If noise arises on the input side of the pulse generation circuit 2 at times T2-T5, pulses caused by the noise are output from the pulse generation circuit 2. At such times, however, with the output of the clock determination circuit 3 being low, the output of the mask circuit 6 remains low. Also, since it is determined that the noise as CLK2 is not normal, the output of the clock determination circuit 4 remains high. Thus, the mask circuit 5 outputs the output of the pulse generation circuit 1 as it is. Accordingly, the output of the logic circuit 7 is the same as the output of the mask circuit 5, allowing the currents supplied to the windings 52 and 53 to be controlled according to step-wise current waveforms.

Figure 7:
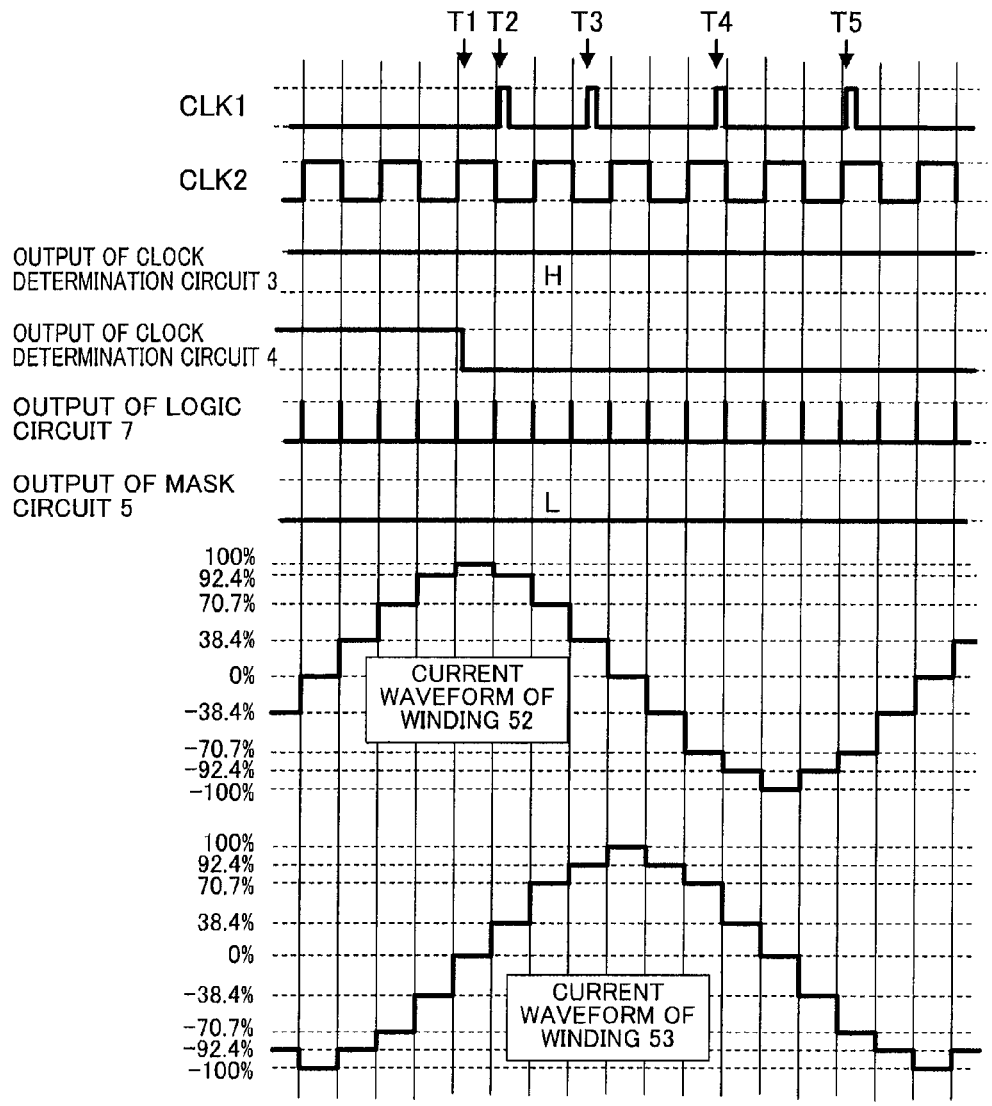
FIG. 7 is another timing chart of the motor drive device of FIG. 1 driven with W1-2 phase excitation.

Conversely, the operation performed when only CLK2 is input will be described with reference to FIG. 7. Since CLK1 is not input, the output of the pulse generation circuit 1 is low. Also, since it is determined that neither CLK1 nor CLK2 is normal immediately after startup, the outputs of the clock determination circuits 3 and 4 are both high. Therefore, the output of the mask circuit 5 is low, and the mask circuit 6 outputs the output of the pulse generation circuit 2 as it is.

Once determining that CLK2 is normal at time T1, the clock determination circuit 4 changes its output to low. If noise arises on the input side of the pulse generation circuit 1 at times T2-T5, pulses caused by the noise are output from the pulse generation circuit 1. At such times, however, with the output of the clock determination circuit 4 being low, the output of the mask circuit 5 remains low. Also, since it is determined that the noise as CLK1 is not normal, the output of the clock determination circuit 3 remains high. Thus, the mask circuit 6 outputs the output of the pulse generation circuit 2 as it is. Accordingly, the output of the logic circuit 7 is the same as the output of the mask circuit 6, allowing the currents supplied to the windings 52 and 53 to be controlled according to step-wise current waveforms.

As described above, in this embodiment, one stepping motor drive device can conform to both the both-edge specification and the one-edge specification. Moreover, if a noise-caused pulse is output from a pulse generation circuit into which no clock signal is input, the motor drive device can be prevented from malfunctioning.

Second Embodiment

Figure 8:
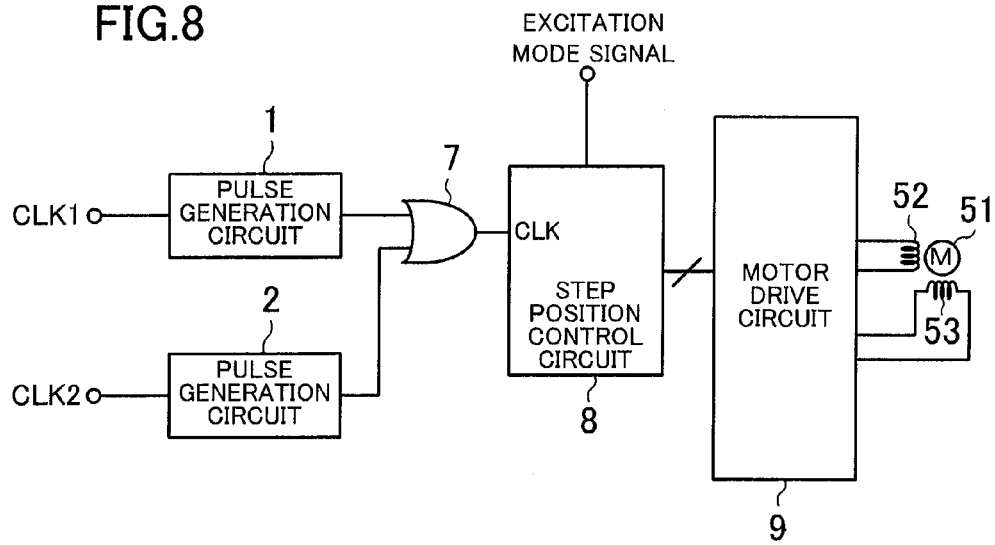
FIG. 8 is a block diagram of a stepping motor drive device of the second embodiment.

FIG. 8 is a block diagram of a stepping motor drive device of the second embodiment. Pulse generation circuits 1 and 2 and a logic circuit 7 are the same in configuration as the pulse generation circuits 1 and 2 and the logic circuit 7 in FIG. 1.

Figure 9:
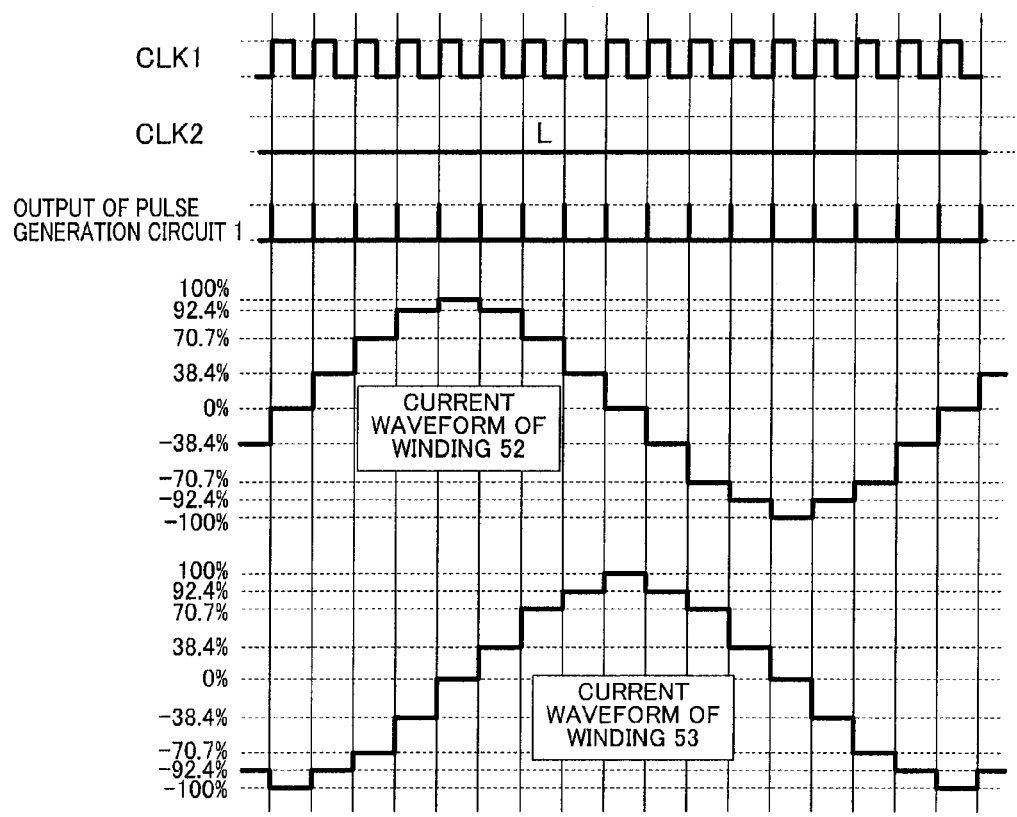
FIG. 9 is a timing chart of the motor drive device of FIG. 8 driven with W1-2 phase excitation.

The operation of the stepping motor drive device of this embodiment will be described with reference to FIG. 9, in which it is assumed that only CLK1 is input. The pulse generation circuit 1 outputs pulses in synchronization with rising edges of CLK1. Since CLK2 is not input, the output of the pulse generation circuit 2 is low. Accordingly, the logic circuit 7 outputs the output of the pulse generation circuit 1 as it is. Accordingly, the currents supplied to the windings 52 and 53 are controlled according to step-wise current waveforms.

Figure 10:
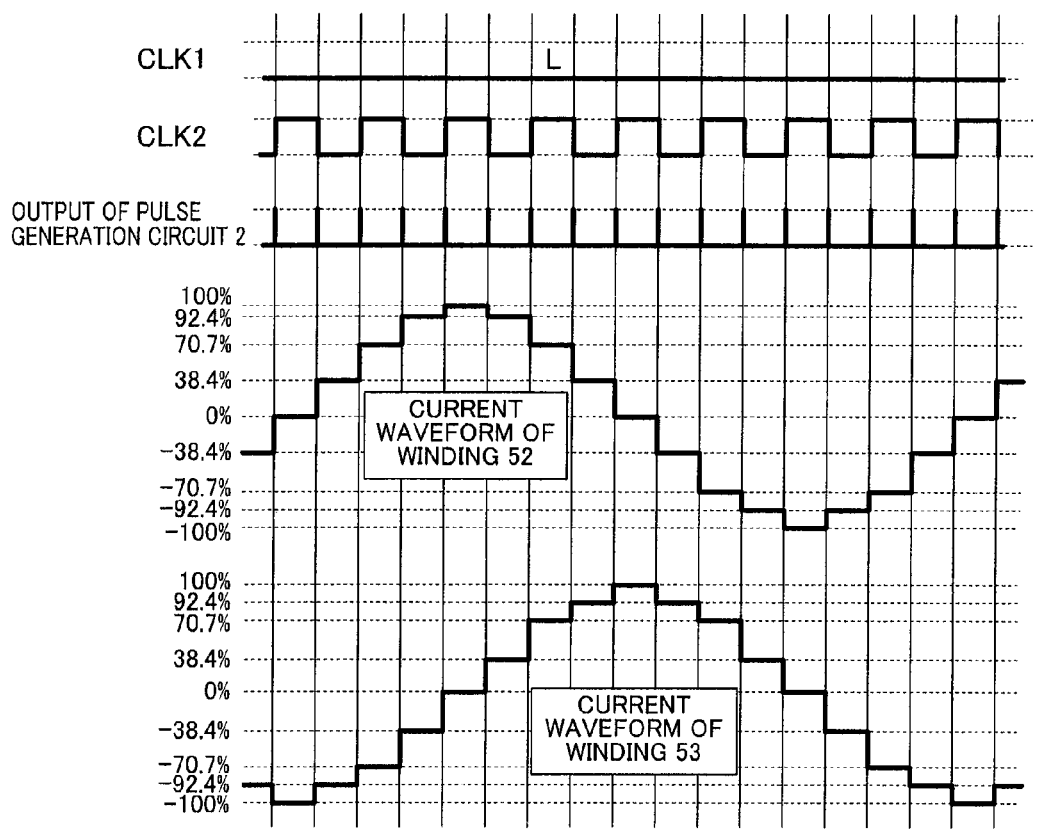
FIG. 10 is another timing chart of the motor drive device of FIG. 8 driven with W1-2 phase excitation.

Conversely, the operation performed when only CLK2 is input will be described with reference to FIG. 10. The pulse generation circuit 2 outputs pulses in synchronization with both rising and falling edges of CLK2. Since CLK1 is not input, the output of the pulse generation circuit 1 is low. Accordingly, the logic circuit 7 outputs the output of the pulse generation circuit 2 as it is. Accordingly, the currents supplied to the windings 52 and 53 are controlled according to step-wise current waveforms.

As described above, in this embodiment, the stepping motor drive device conforming to both specifications can be implemented in a configuration simpler than that in the first embodiment. Thus, the cost and circuit area of the motor drive device can be reduced.

Third Embodiment

Figure 11:
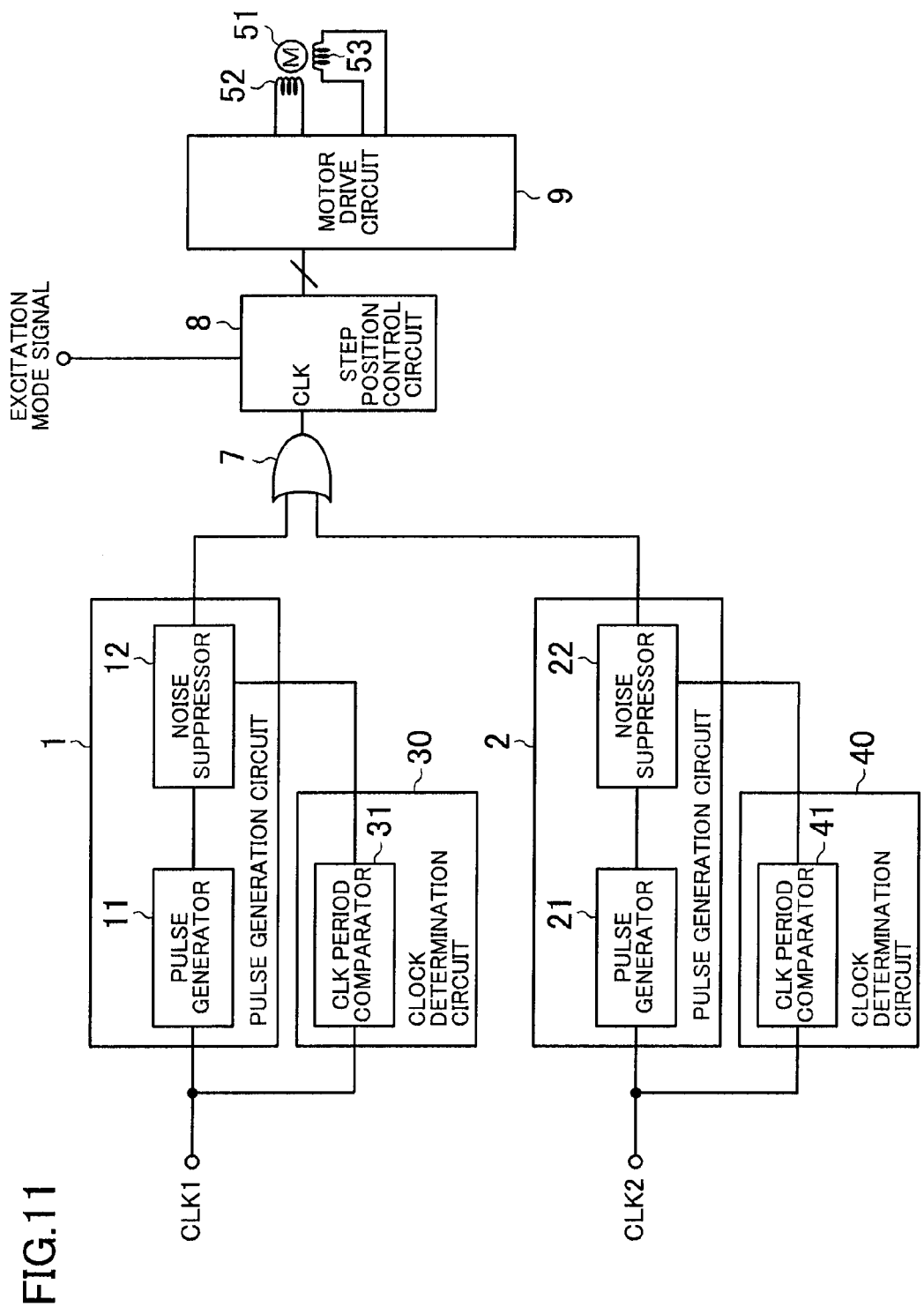
FIG. 11 is a block diagram of a stepping motor drive device of the third embodiment.

FIG. 11 is a block diagram of a stepping motor drive device of the third embodiment. A pulse generation circuit 1 can be comprised of a pulse generator 11 and a noise suppressor 12. The pulse generator 11 generates high differential pulses in synchronization with rising edges of CLK1. The noise suppressor 12 outputs differential pulses at the output timing from the pulse generator 11 when a clock determination circuit 30 determines that CLK1 is normal. When the clock determination circuit 30 determines that CLK1 is not normal, the noise suppressor 12 does not output a differential pulse.

A pulse generation circuit 2 can be comprised of a pulse generator 21 and a noise suppressor 22. The pulse generator 21 generates high differential pulses in synchronization with both rising and falling edges of CLK2. The noise suppressor 22 outputs differential pulses at the output timing from the pulse generator 21 when a clock determination circuit 40 determines that CLK2 is normal. When the clock determination circuit 40 determines that CLK2 is not normal, the noise suppressor 22 does not output a differential pulse. CLK period comparators 31 and 41 are the same in configuration as the CLK period comparator 31, 41 in FIG. 2. Since the noise suppressors 12 and 22 are the same in configuration, only the noise suppressor 12 will be described hereinafter.

Figure 12:
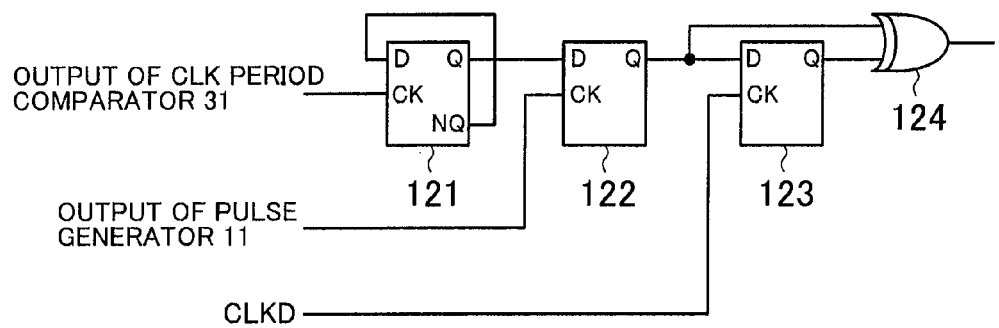
FIG. 12 is a block diagram of a noise suppressor in FIG. 11.
Figure 13:
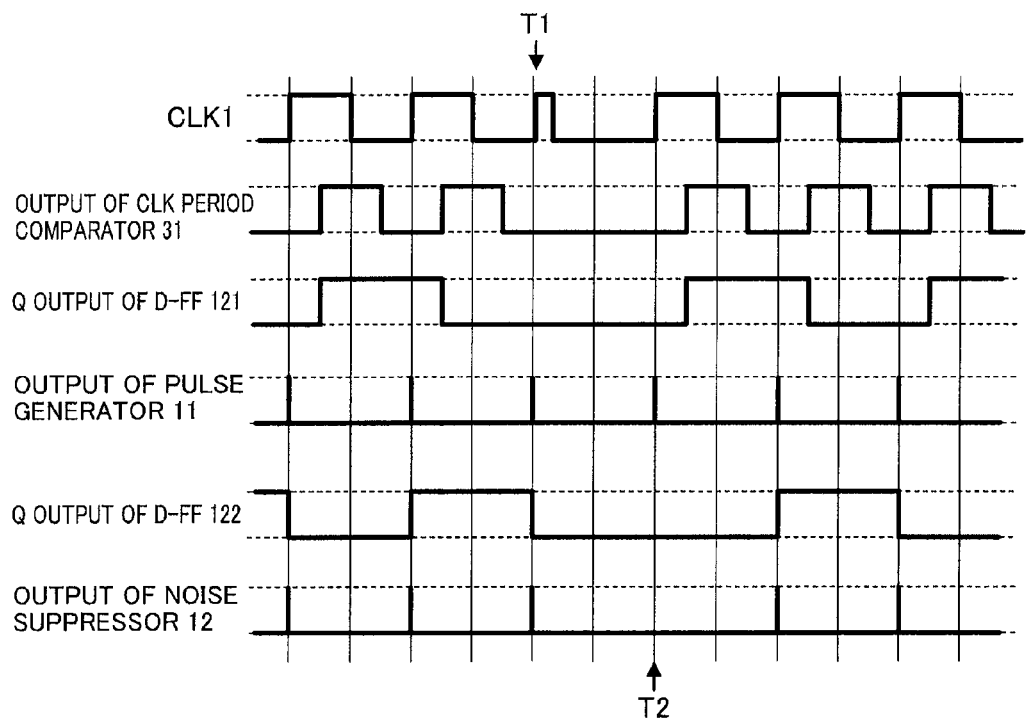
FIG. 13 is a timing chart of the noise suppressor of FIG. 12.

As shown in FIG. 12, the noise suppressor 12 can be comprised of three D-FFs 121, 122, and 123 and an EX-OR circuit 124. Note that the frequency of a reference clock signal CLKD supplied to CK of the D-FF 123 is in the order of several megahertz to several tens of megahertz. The noise suppressor 12 outputs a pulse according to the output of the pulse generator 11 when the CLK period comparator 31 outputs a pulse as having determined that CLK1 is normal. For example, as shown in FIG. 13, if short-period noise is input at time T1 as CLK1, no pulse is output from the CLK period comparator 31 immediately after time T1, and thus the noise suppressor 12 does not output a pulse at time T2.

Figure 14:
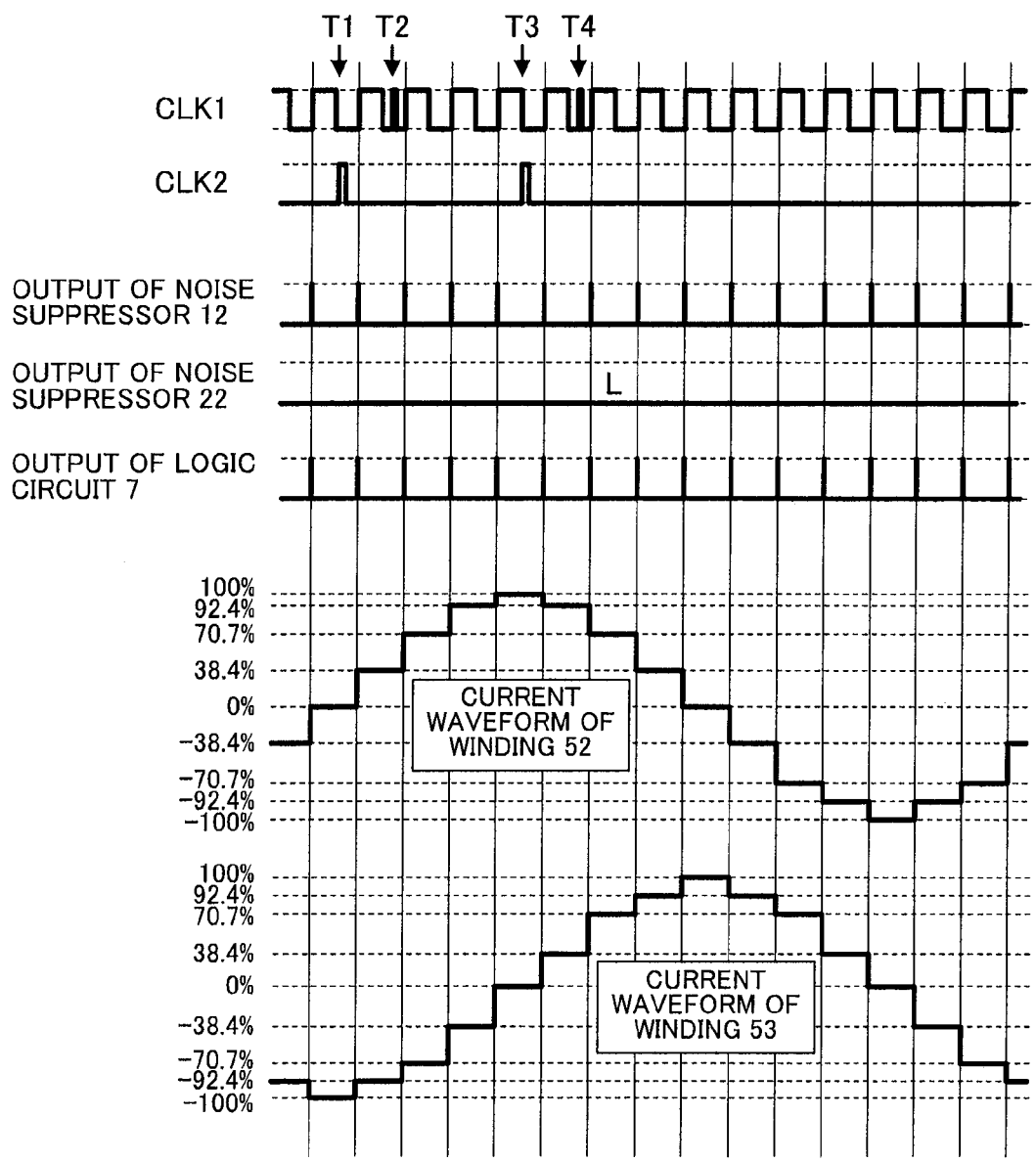
FIG. 14 is a timing chart of the motor drive device of FIG. 11 driven with W1-2 phase excitation.

The operation of the stepping motor drive device of this embodiment will be described with reference to FIG. 14, in which it is assumed that only CLK1 is input. Since it is determined that CLK1 is normal, the noise suppressor 12 outputs pulses at the output timing from the pulse generator 11. Since CLK2 is not input, the output of the noise suppressor 22 is low.

Even if noise arises on the input side of the pulse generator 21 at times T1 and T3, the output of the noise suppressor 22 remains low because it is determined that the noise as CLK2 is not normal. If noise is included in CLK1 at times T2 and T4, pulses caused by the noise are output from the pulse generator 11. However, since it is determined that the noise as CLK1 is not normal, no noise-caused pulses are output from the noise suppressor 12. Accordingly, the logic circuit 7 outputs the output of the noise suppressor 12 as it is, allowing the currents supplied to the windings 52 and 53 to be controlled according to step-wise current waveforms.

Figure 15:
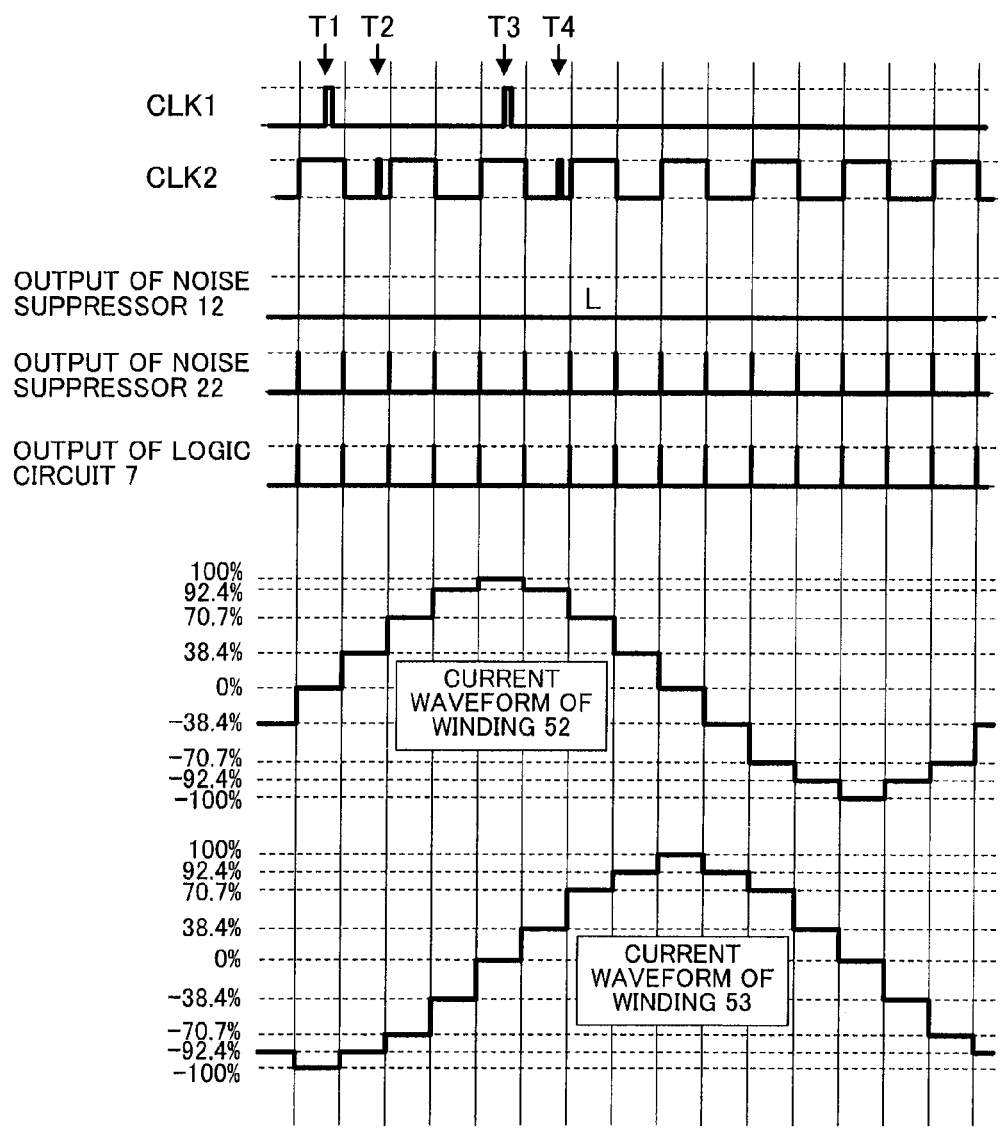
FIG. 15 is another timing chart of the motor drive device of FIG. 11 driven with W1-2 phase excitation.

Conversely, the operation performed when only CLK2 is input will be described with reference to FIG. 15. Since it is determined that CLK2 is normal, the noise suppressor 22 outputs pulses at the output timing from the pulse generator 21. Since CLK1 is not input, the output of the noise suppressor 12 is low.

Even if noise arises on the input side of the pulse generator 11 at times T1 and T3, the output of the noise suppressor 12 remains low because it is determined that the noise as CLK1 is not normal. If noise is included in CLK2 at times T2 and T4, pulses caused by the noise are output from the pulse generator 21. However, since it is determined that the noise as CLK2 is not normal, no noise-caused pulses are output from the noise suppressor 22. Accordingly, the logic circuit 7 outputs the output of the noise suppressor 22 as it is, allowing the currents supplied to the windings 52 and 53 to be controlled according to step-wise current waveforms.

As described above, in this embodiment, even if noise is included in an input clock signal, the stepping motor drive device can be prevented from malfunctioning due to the noise.

Fourth Embodiment

Figure 16:
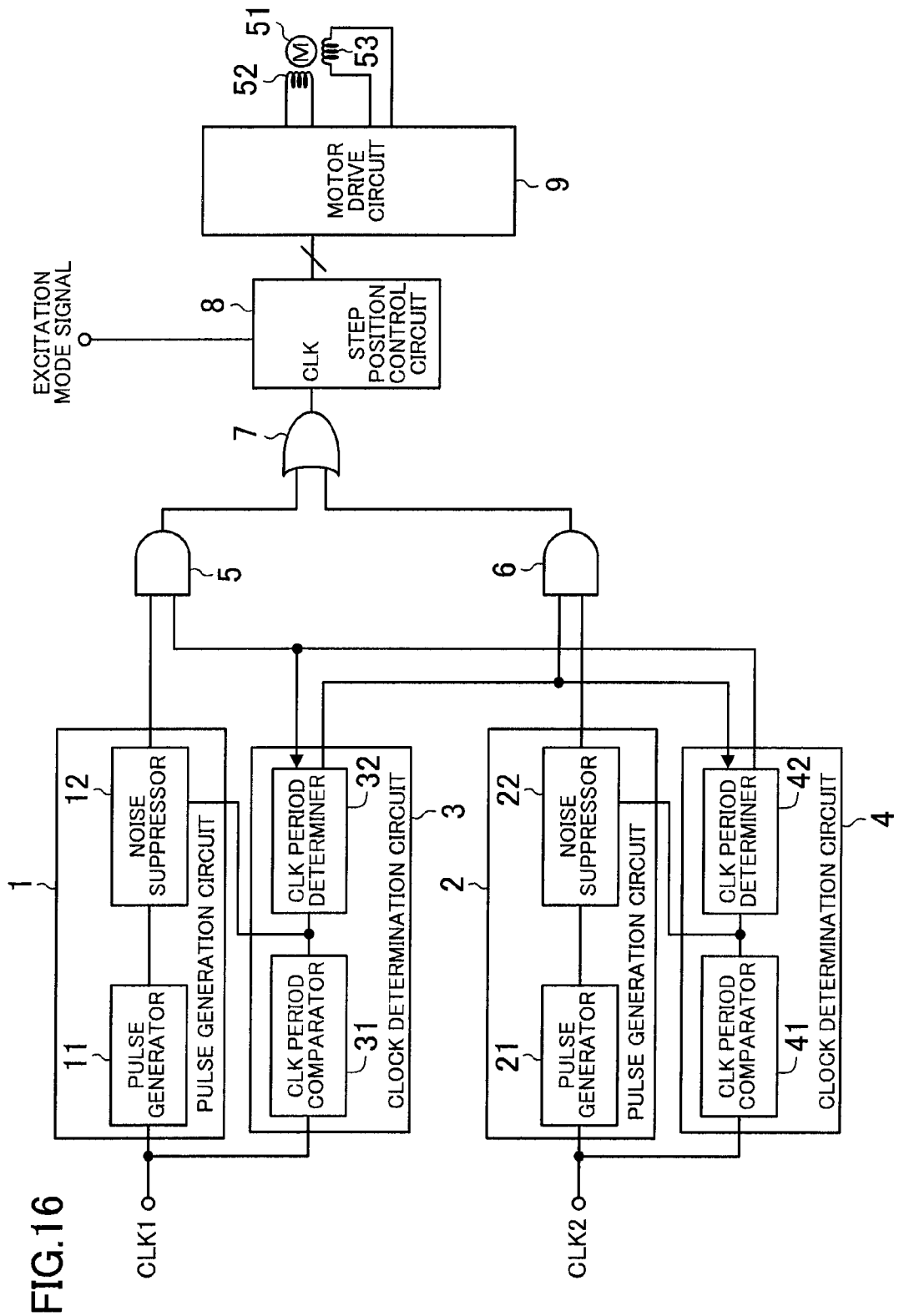
FIG. 16 is a block diagram of a stepping motor drive device of the fourth embodiment.

FIG. 16 is a block diagram of a stepping motor drive device of the fourth embodiment. Pulse generation circuits 1 and 2 are the same in configuration as the pulse generation circuits 1 and 2 in FIG. 11, and clock determination circuits 3 and 4 and mask circuits 5 and 6 are respectively the same in configuration as the clock determination circuits 3 and 4 and the mask circuits 5 and 6 in FIG. 1.

Figure 17:
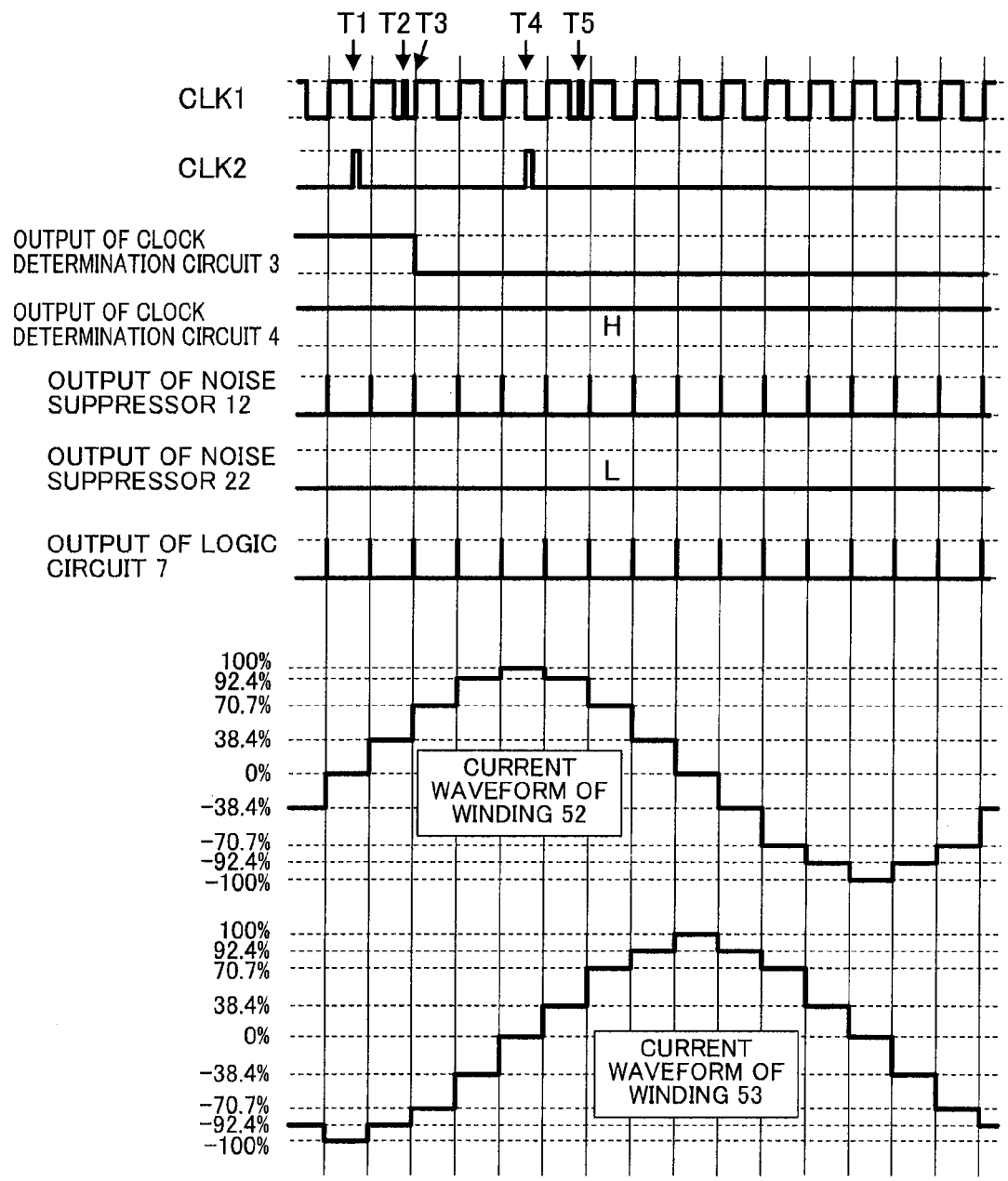
FIG. 17 is a timing chart of the motor drive device of FIG. 16 driven with W1-2 phase excitation.

The operation of the stepping motor drive device of this embodiment will be described with reference to FIG. 17, in which it is assumed that only CLK1 is input. The noise suppressor 12 outputs pulses at the output timing from the pulse generator 11. Since CLK2 is not input, both the outputs of the noise suppressor 22 and the mask circuit 6 are low. Also, immediately after startup of the motor drive device, both the outputs of the clock determination circuits 5 and 6 are high.

Even if noise arises on the input side of the pulse generation circuit 2 at time T1, both the outputs of the noise suppressor 22 and the mask circuit 6 remain low. If noise is included in CLK1 at times T2 and T5, pulses caused by the noise are output from the pulse generator 11. However, no noise-caused pulses are output from the noise suppressor 12.

Once it is determined that CLK1 is normal at time T3, the output of the clock determination circuit 3 goes low. Even if noise arises on the input side of the pulse generation circuit 2 at time T4, the output of the mask circuit 6 remains low because the output of the clock determination circuit 3 is low. Accordingly, the logic circuit 7 outputs the output of the noise suppressor 12 as it is, allowing the currents supplied to the windings 52 and 53 to be controlled according to step-wise current waveforms.

Figure 18:
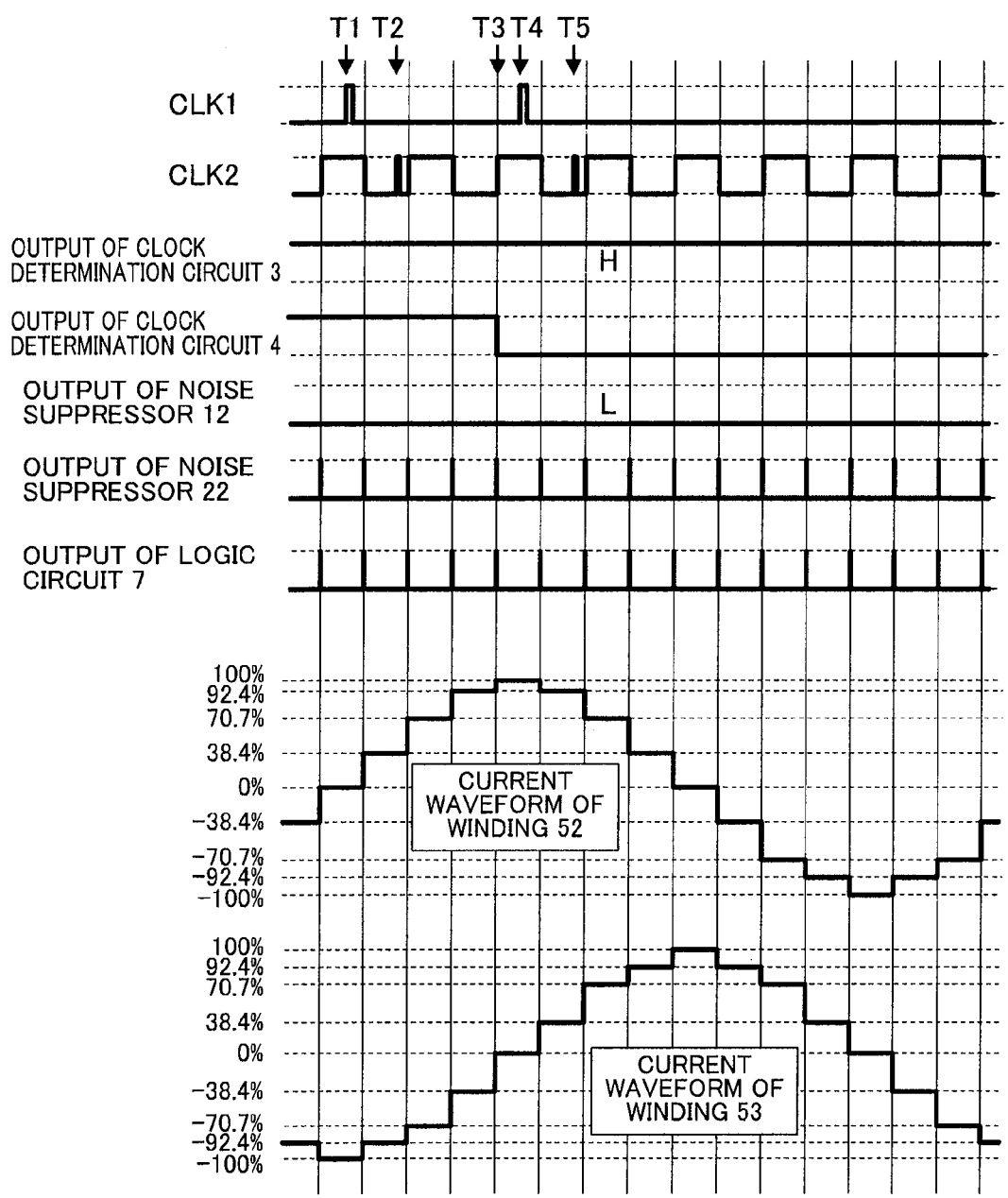
FIG. 18 is another timing chart of the motor drive device of FIG. 16 driven with W1-2 phase excitation.
Figure 19:
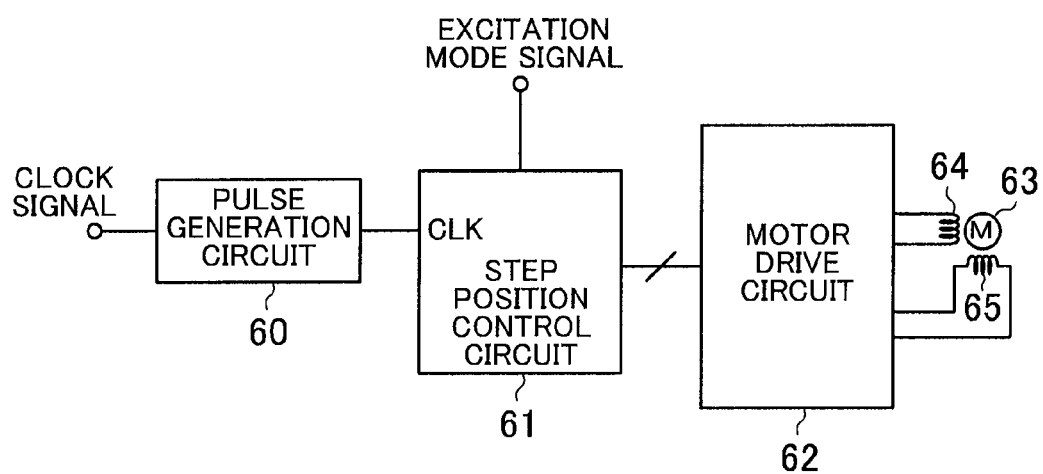
FIG. 19 is a block diagram of a conventional stepping motor drive device.

Conversely, the operation performed when only CLK2 is input will be described with reference to FIG. 18. The noise suppressor 22 outputs pulses at the output timing from the pulse generator 21. Since CLK1 is not input, both the outputs of the noise suppressor 12 and the mask circuit 5 are low. Also, immediately after startup of the motor drive device, both the outputs of the clock determination circuits 5 and 6 are high.

Even if noise arises on the input side of the pulse generation circuit 1 at time T1, both the outputs of the noise suppressor 12 and the mask circuit 5 remain low. If noise is included in CLK2 at times T2 and T5, pulses caused by the noise are output from the pulse generator 21. However, no noise-caused pulses are output from the noise suppressor 22.

Once it is determined that CLK2 is normal at time T3, the output of the clock determination circuit 4 goes low. Even if noise arises on the input side of the pulse generation circuit 1 at time T4, the output of the mask circuit 5 remains low because the output of the clock determination circuit 4 is low. Accordingly, the logic circuit 7 outputs the output of the noise suppressor 22 as it is, allowing the currents supplied to the windings 52 and 53 to be controlled according to step-wise current waveforms.

As described above, in this embodiment, even if noise is included in an input clock signal, and even if a noise-caused pulse is output from a pulse generation circuit into which no clock signal is input, the stepping motor drive device can be prevented from malfunctioning.

What is claimed is:

1. A stepping motor drive device, comprising:
 a first pulse generation circuit configured to generate pulses in synchronization with either rising edges or falling edges of a first clock signal;
 a second pulse generation circuit configured to generate pulses in synchronization with both rising edges and falling edges of a second clock signal;
 a first clock determination circuit configured to determine whether the first clock signal is normal;
 a second clock determination circuit configured to determine whether the second clock signal is normal;
 a first mask circuit configured to receive an output of the first pulse generation circuit, and output the output of the first pulse generation circuit as it is if the second clock signal is not normal or mask the output of the first pulse generation circuit if the second clock signal is normal;
 a second mask circuit configured to receive an output of the second pulse generation circuit, and output the output of the second pulse generation circuit as it is if the first clock signal is not normal or mask the output of the second pulse generation circuit if the first clock signal is normal;
 a logic circuit configured to logically combine outputs of the first and second mask circuits;
 a step position control circuit configured to determine a step position of a stepping motor according to an output of the logic circuit, and
 a motor drive section configured to supply a current to the stepping motor according to an output of the step position control circuit.

2. The stepping motor drive device of claim 1, wherein
 the first pulse generation circuit generates pulses when the first clock signal is normal, and
 the second pulse generation circuit generates pulses when the second clock signal is normal.

3. The stepping motor drive device of claim 2, wherein
 the first clock determination circuit determines whether the first clock signal is normal based on a period of the first clock signal, and
 the second clock determination circuit determines whether the second clock signal is normal based on a period of the second clock signal.

4. The stepping motor drive device of claim 1, wherein
 the step position control circuit switches one excitation mode to another according to a supplied excitation mode signal.

5. A stepping motor drive device, comprising:
 a first pulse generation circuit configured to generate first pulses in synchronization with either rising edges or falling edges of a first clock signal received by the first pulse generation circuit;
 a second pulse generation circuit configured to generate second pulses in synchronization with both rising edges and falling edges of a second clock signal received by the second pulse generation circuit;
 a logic circuit configured to logically combine outputs of the first and second pulse generation circuits;
 a step position control circuit configured to determine a step position of a stepping motor according to an output of the logic circuit, and
 a motor drive section configured to supply a current to the stepping motor according to an output of the step position control circuit.

6. The stepping motor drive device of claim 5, further comprising:
 a first clock determination circuit configured to determine whether the first clock signal is normal; and
 a second clock determination circuit configured to determine whether the second clock signal is normal,
 wherein
 the first pulse generation circuit generates pulses when the first clock signal is normal, and
 the second pulse generation circuit generates pulses when the second clock signal is normal.

7. The stepping motor drive device of claim 6 wherein
 the first clock determination circuit determines whether the first clock signal is normal based on a period of the first clock signal, and
 the second clock determination circuit determines whether the second clock signal is normal based on a period of the second clock signal.

8. The stepping motor drive device of claim 5 wherein
 the step position control circuit switches one excitation mode to another according to a supplied excitation mode signal.

9. The stepping motor drive device of claim 5 wherein the first pulses have a first pulse width and the second pulses have a second pulse width, and at least one of the first pulse width and the second pulse width is constant.

10. The stepping motor drive device of claim 9 wherein a pulse width of the output of the logic circuit is constant.

11. The stepping motor drive device of claim 5 wherein a pulse width of the output of the logic circuit is constant.

\* \* \* \* \*